US010693369B2

(12) United States Patent
Ku et al.

(10) Patent No.: US 10,693,369 B2
(45) Date of Patent: Jun. 23, 2020

(54) VOLTAGE CONTROL DEVICE APPLIED IN A MEMORY SYSTEM

(71) Applicant: eMemory Technology Inc., Hsin-Chu (TW)

(72) Inventors: Wei-Ming Ku, Hsinchu County (TW); Wei-Chiang Ong, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 16/365,661

(22) Filed: Mar. 26, 2019

(65) Prior Publication Data

US 2019/0372456 A1    Dec. 5, 2019

Related U.S. Application Data

(60) Provisional application No. 62/677,196, filed on May 29, 2018.

(30) Foreign Application Priority Data

Nov. 28, 2018    (TW) .............................. 107142468 A

(51) Int. Cl.
*G11C 16/30* (2006.01)
*H02M 3/07* (2006.01)
(Continued)

(52) U.S. Cl.
CPC .............. *H02M 3/07* (2013.01); *G05F 1/465* (2013.01); *G06F 7/588* (2013.01); *G11C 16/30* (2013.01); *H03B 29/00* (2013.01)

(58) Field of Classification Search
CPC ...... H04L 9/3278; H04L 9/0866; H02M 3/07; G06F 7/588; H03B 29/00; G05F 1/465;
(Continued)

(56) References Cited

U.S. PATENT DOCUMENTS

| 5,602,794 A | * | 2/1997 | Javanifard | ............. | G11C 5/145 |
| | | | | | 365/226 |
| 5,909,141 A | * | 6/1999 | Tomishima | ............. | G11C 5/143 |
| | | | | | 327/534 |

(Continued)

FOREIGN PATENT DOCUMENTS

| CN | 103457346 A | 12/2013 |
| CN | 104640267 A | 5/2015 |

(Continued)

*Primary Examiner* — Khamdan N. Alrobaie
(74) *Attorney, Agent, or Firm* — Winston Hsu

(57) ABSTRACT

A voltage control device includes a first charge pump, a first power switch, a second charge pump, a second power switch, and a third power switch. The first charge pump generates a first application voltage according to the first system voltage. The first power switch has a first input terminal for receiving the first system voltage, a second input terminal for receiving the first application voltage, and an output terminal. The second charge pump generates a second application voltage according to a voltage received by the input terminal of the second charge pump. The second power switch has an input terminal for receiving the second application voltage, and an output terminal. The third power switch has a first input terminal coupled to the output terminal of the first charge pump, a second input terminal coupled to the output terminal of the second charge pump, and an output terminal.

15 Claims, 2 Drawing Sheets

(51) Int. Cl.
*G05F 1/46* (2006.01)
*G06F 7/58* (2006.01)
*H03B 29/00* (2006.01)

(58) Field of Classification Search
CPC . G11C 16/30; G11C 11/4091; G11C 13/0004;
G11C 13/0007; G11C 11/1673; G11C
13/004; G11C 17/16
See application file for complete search history.

(56) References Cited

U.S. PATENT DOCUMENTS

| | | | |
|---|---|---|---|
| 6,642,773 B2 * | 11/2003 | Lin | H02M 3/073 |
| | | | 327/536 |
| 7,427,889 B2 * | 9/2008 | Lin | G11C 5/145 |
| | | | 327/535 |
| 10,236,770 B1 * | 3/2019 | Ker | H02M 3/073 |
| 2003/0095423 A1 | 5/2003 | Hirst | |
| 2008/0136500 A1 | 6/2008 | Frulio | |
| 2012/0319762 A1 | 12/2012 | Watanabe | |
| 2013/0063118 A1 * | 3/2013 | Nguyen | G11C 5/145 |
| | | | 323/304 |
| 2013/0265103 A1 * | 10/2013 | Hayashi | G11C 5/145 |
| | | | 327/535 |
| 2013/0301175 A1 | 11/2013 | Posat | |
| 2019/0372456 A1 * | 12/2019 | Ku | G11C 11/1673 |

FOREIGN PATENT DOCUMENTS

| | | |
|---|---|---|
| EP | 1229548 | 5/2008 |
| TW | 201301730 A1 | 1/2013 |
| TW | 201438388 A | 10/2014 |
| TW | 201519693 A | 5/2015 |

* cited by examiner

VOLTAGE CONTROL DEVICE APPLIED IN A MEMORY SYSTEM

CROSS REFERENCE TO RELATED APPLICATIONS

This non-provisional application claims priority of U.S. provisional application No. 62/677,196, filed on May 29, 2018, included herein by reference in its entirety.

BACKGROUND OF THE INVENTION

1. Field of the Invention

The present invention is related to a voltage control device, and more particularly, a voltage control device having a small area applied in a memory system.

2. Description of the Prior Art

To meet the low power consumption requirements of electronic devices, the power specifications of integrated circuits (ICs) are often redesigned to operate in a low voltage environment for reducing power loss. For example, integrated circuits with a power specification of 5V in the past are usually redesigned to operate with a voltage of 3.3V or even below 2V nowadays. Although low voltage operation can reduce power loss, the circuits with low power specifications may still require high voltages to perform in some applications. For example, the flash memory would require high voltages for program operations and erase operations. The high voltages are often provided by the charge pump circuits.

Since the flash memory may require two different sets of high voltages for the program operations and the erase operation, and the current loading required for the two operations may vary, in the prior art, two different sets of charge pumps are often utilized to generate high voltages for the program operation and erase operation respectively. In this case, the charge pump used to generate the higher voltage would require a boost circuit with more stages while the charge pump used to provide the larger current would utilize a larger boost circuit component. To implement charge pumps for two different targets will increase the circuit area and conflict with the circuit design requirements.

SUMMARY OF THE INVENTION

One embodiment of the present invention discloses a voltage control device. The voltage control device includes a first charge pump, a first power switch, a second charge pump, a second power switch, and a third power switch.

The first charge pump has an input terminal for receiving a first system voltage, and an output terminal for outputting a first application voltage. The first charge pump generates the first application voltage according to the first system voltage.

The first power switch has a first input terminal for receiving the first system voltage, a second input terminal for receiving the first application voltage, and an output terminal.

The second charge pump has an input terminal coupled to the output terminal of the first power switch, and an output terminal for outputting a second application voltage. The second charge pump generates the second application voltage according to a voltage received by the input terminal of the second charge pump.

The second power switch has an input terminal for receiving the second application voltage, and an output terminal. The third power switch has a first input terminal coupled to the output terminal of the first charge pump, a second input terminal coupled to the output terminal of the second charge pump, and an output terminal.

Another embodiment of the present invention discloses a memory system. The memory system includes a voltage control device and a memory array.

The voltage control device includes a first charge pump, a first power switch, a second charge pump, a second power switch, and a third power switch.

The first charge pump has an input terminal for receiving a first system voltage, and an output terminal for outputting a first application voltage. The first charge pump generates the first application voltage according to the first system voltage.

The first power switch has a first input terminal for receiving the first system voltage, a second input terminal for receiving the first application voltage, and an output terminal.

The second charge pump has an input terminal coupled to the output terminal of the first power switch, and an output terminal for outputting a second application voltage. The second charge pump generates the second application voltage according to a voltage received by the input terminal of the second charge pump.

The second power switch has an input terminal for receiving the second application voltage, and an output terminal. The third power switch has a first input terminal coupled to the output terminal of the first charge pump, a second input terminal coupled to the output terminal of the second charge pump, and an output terminal.

The memory array includes a plurality of memory cells, and is coupled to the voltage control device. The memory array receives voltages outputted by the voltage control device, and controls the plurality of memory cells according to the voltages.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
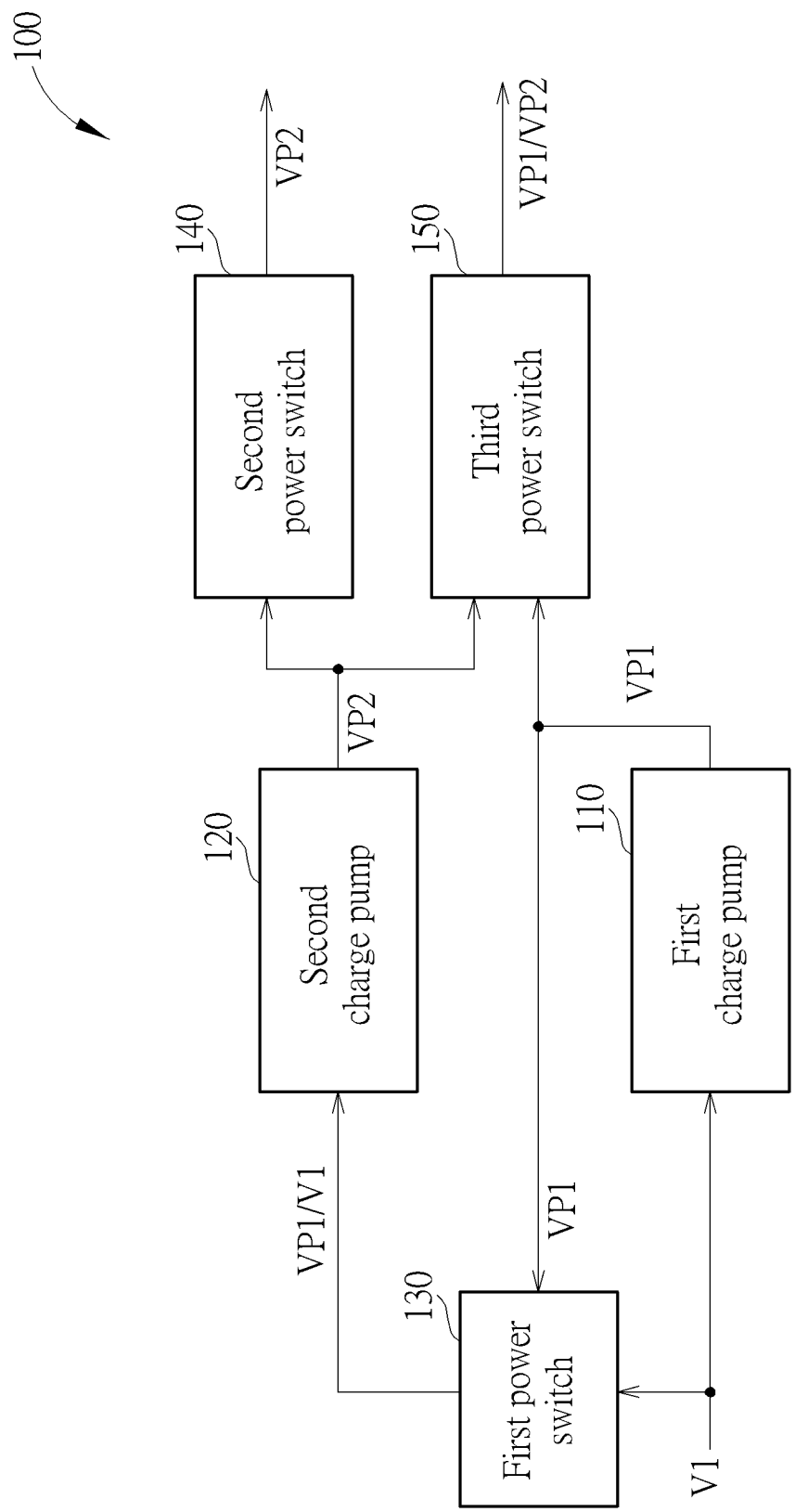
FIG. 1 shows a voltage control device according to one embodiment of the present invention.

FIG. 1 shows a voltage control device 100 according to one embodiment of the present invention. The voltage control device 100 includes a first charge pump 110, a second charge pump 120, a first power switch 130, a second power switch 140, and a third power switch 150.

The first charge pump 110 has an input terminal and an output terminal. The input terminal of the first charge pump 110 can receive a first system voltage V1. The first charge pump 110 can generate a first application voltage VP1 according to the first system voltage V1, and output the first application voltage VP1 through the output terminal of the first charge pump 110. In some embodiments, the first system voltage V1 can be a default operation voltage in the system, and can be provided by the constant voltage source.

However, the first application voltage VP1 can be the operation voltage required by some specific applications or some specific circuits.

The first power switch 130 has a first input terminal, a second input terminal, and an output terminal. The first input terminal of the first power switch 130 can receive the first system voltage V1, and the second input terminal of the first power switch 130 can receive the first application voltage VP1. The first power switch 130 can switch between the first input output terminal and the second input terminal to output the first system voltage V1 or the first application voltage VP1 through the output terminal of the first power switch 130.

The second charge pump 120 has an input terminal and an output terminal. The input terminal of the second charge pump 120 can be coupled to the output terminal of the first power switch 130. The second charge pump 120 can generate a second application voltage VP2 according to the voltage at the input terminal of the second charge pump 120, and output the second application voltage VP2 through the output terminal of the second charge pump 120.

The second power switch 140 has an input terminal and an output terminal. The input terminal of the second power switch 140 can receive the second application voltage VP2. The second power switch 140 can output the second application voltage VP2 or stop outputting voltage according to the operation mode of the voltage control device 100.

The third power switch 150 has a first input terminal, a second input terminal and an output terminal. The first input terminal of the third power switch 150 is coupled to the output terminal of the first charge pump 110, and the second input terminal of the third power switch 150 is coupled to the output terminal of the second charge pump 120. The third power switch 150 can switch between the first input terminal and the second input terminal for outputting the voltage generated by the first charge pump 110 and/or the voltage generated by the second charge pump 120 through the output terminal of the third power switch 150.

With the first power switch 130, the second power switch 140, and the third power switch 150, the voltage control device 100 is able to output voltages with the first charge pump 110 and the second charge pump 120 more flexibly to meet different requirements of the application.

For example, when the voltage control device 100 operates in the first mode to output a high second application voltage, the output terminal of the first power switch 130 can output the first application voltage VP1 generated by the first charge pump 110 so the second charge pump 120 will receive the first application voltage VP1 and generate the second application voltage VP2 according to the first application voltage VP1. Also, the output terminal of the second power switch 140 will output the second application voltage VP2 for satisfying the requirement of subsequent operations. In some embodiments, the first application voltage VP1 can be higher than the first system voltage V1, and the second application voltage VP2 can be higher than the first application voltage VP1. For example, the first system voltage V1 can be 2.5V, the first application voltage VP1 can be 8V, and the second application voltage VP2 can be 15V.

That is, the first charge pump 110 can raise the first system voltage V1 to generate the first application voltage VP1, and the second charge pump 120 can raise the first application voltage VP1 to generate the second application voltage VP2. Consequently, the second charge pump 120 will not need to generate the second application voltage VP2 by raising the first system voltage V1, which is at a rather low level, thereby reducing the number of boost stages required by the second charge pump 120, and also reducing the circuit area.

In addition, when the voltage control device 100 operates in the second mode to output the application voltage with higher current loading, the output terminal of the first power switch 130 can output the first system voltage V1. In this case, both of the first charge pump 110 and the second charge pump 120 can boost the voltages according to the first system voltage V1, and can generate the first application voltage VP1 and the second application voltage VP2 respectively. In this case, the first application voltage VP1 can be substantially equal to the second application voltage VP2, and the first application voltage VP1 can still be higher than the first system voltage V1. For example, the first system voltage V1 can be 2.5V, and the first application voltage VP1 and the second application voltage VP2 can be 8V. In some embodiments, the first charge pump 110 and the second charge pump 120 can include voltage comparators, and the voltage comparators can compare the output voltages of the first charge pump 110 and the second charge pump 120 with the default reference voltage. In this case, the first charge pump 110 and the second charge pump 120 will activate the internal boost mechanisms to raise the output voltages whenever the output voltages are lower than the reference voltage. Consequently, by adjusting the value of the reference voltage, the first charge pump 110 and the second charge pump 120 will output voltages with the required values.

In this case, the third power switch 150 can form a current path between the first input terminal of the third power switch 150 and the output terminal of the third power switch 150 to output the first application voltage VP1, and form a current path between the second input terminal of the third power switch 150 and the output terminal of the third power switch 150 to output the second application voltage VP2 at the same time. Consequently, the first charge pump 110 and the second charge pump 120 can provide the required application voltages together, thereby reducing the current loading required by the single charge pump, so that the first charge pump 110 and the second charge pump 120 can be implemented with smaller circuit components to reduce the circuit area.

Furthermore, in some embodiments, the current loading supported by the first charge pump 110 and the second charge pump 120 can be different. For example, the first charge pump 110 can support a higher current than the second charge pump 120. Consequently, when in the first mode, the second charge pump 120 can generate the high voltage with the first application voltage VP1 more stably, while in the second mode, the first charge pump 110 would be able to provide most of the current loading. Therefore, the first charge pump 110 and the second charge pump 120 can cooperate with each other in different modes to make the circuit design more flexible.

Since the voltage control device 100 can utilize the first charge pump 110 and the second charge pump 120 flexibly to generate the first application voltage VP1 and the second application voltage VP2 required in different modes, the efficiency of the circuit usage of the voltage control device 100 can be improved, and the overall circuit area can be reduced.

In some embodiments, the voltage control device 100 can be applied in the memory system for providing the voltages required by the program operations and the erase operations of the memory cells. For example, if the erase operation is performed with the Fowler-Nordheim tunneling effect and the program operation is performed with channel hot electron injection, then the memory cell will need a high voltage, such as 8V, with a large current for the program operation. In this case, the voltage control device 100 can operate in the second mode. However, when performing the erase operation, the memory cell will need an even higher voltage, such as 15V, with a relatively smaller current. In this case, the voltage control device 100 can operate in the first mode.

Figure 2:
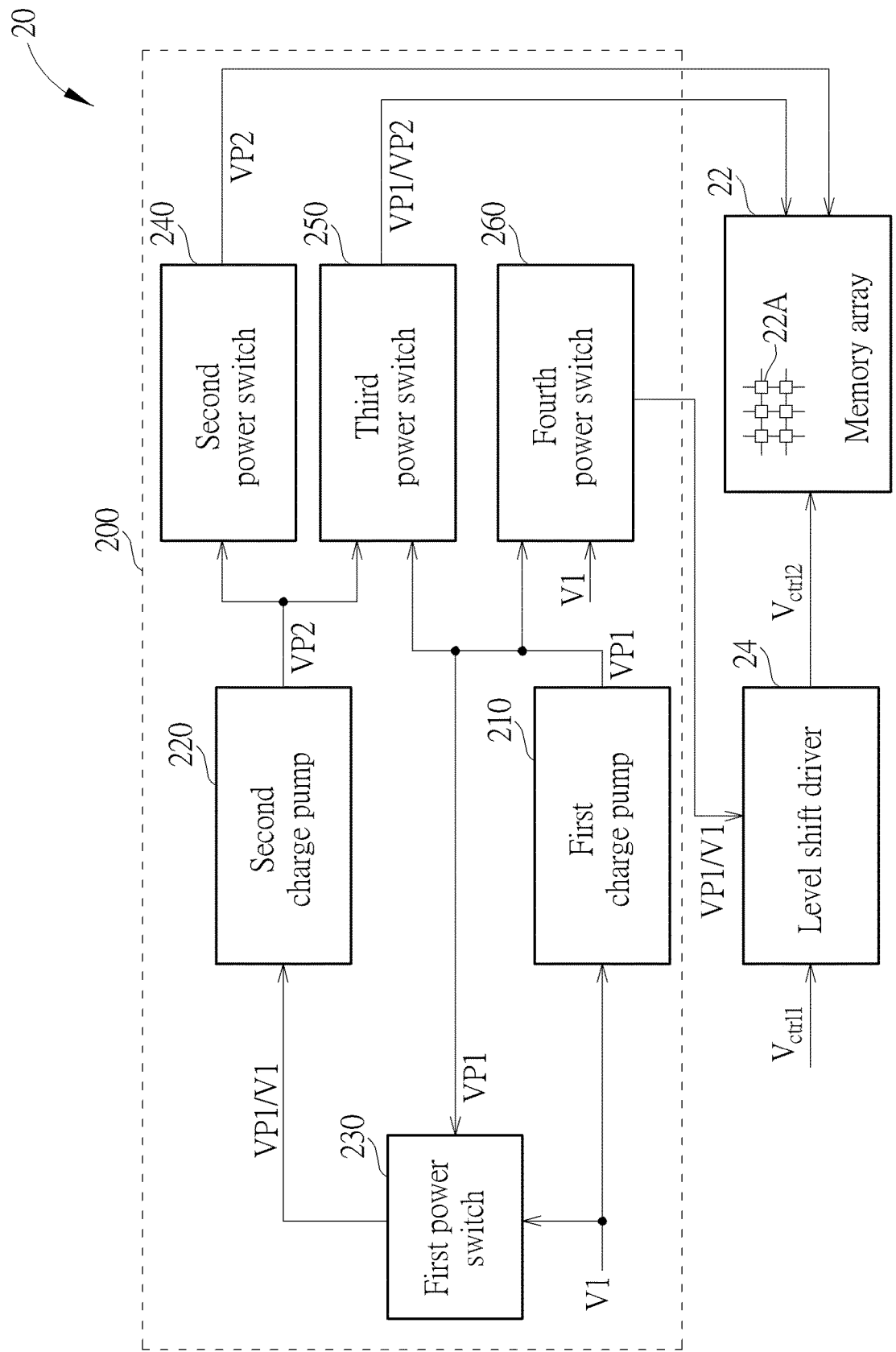
FIG. 2 shows a memory system according to one embodiment of the present invention.

FIG. 2 shows a memory system 20 according to one embodiment of the present invention. The memory system 20 includes a voltage control device 200 and a memory array 22. The voltage control devices 100 and 200 have similar structures and can be operated with similar principles. The memory array 22 is coupled to the voltage control device 200, and can include a plurality of memory cells 22A.

When memory system 20 performs the erase operation, the voltage control device 200 can enter the first mode. In this case, the output terminal of the first power switch 230 will output the first application voltage VP1 generated by the first charge pump 210, so that the second charge pump 220 can generate the second application voltage VP2 by raising the first application voltage VP1, and the second power switch 240 can output the second application voltage VP2 through its output terminal. In some embodiments, the second application voltage VP2 can be higher than the first application voltage VP1, and the first application voltage VP1 can be higher than the first system voltage V1. Consequently, the memory array 22 can receive the second application voltage VP2 as the erase voltage, and perform the erase operation to at least one memory cell 22A accordingly.

When the memory system 20 performs the program operation, the voltage control device 200 can enter the second mode. In this case, the output terminal of the first power switch 230 can output the first system voltage V1, and the first charge pump 210 and the second charge pump 220 can generate the first application voltage VP1 and the second application voltage VP2, which are substantially the same, both are generated according to the first system voltage V1. Furthermore, the third power switch 250 can output the first application voltage VP1 and the second application voltage VP2 at the same time to cope with the large current load required by program operation. In this case, the memory array 22 can receive the first application voltage VP1 and the second application VP2 as the program voltage, and perform the program operation to at least one memory cell 22A accordingly.

In addition, in some embodiments, when performing the usual selection operations or read operations to the memory cells 22A in the memory array 22, the external input logic voltage $V_{ctrl1}$ may be a lower operation voltage, for example, the input logic voltage $V_{ctrl1}$ may be between 1.2V and 2V. In this case, to drive the transistors and components in the memory cells 22A smoothly, the memory system 20 may further include a level shift driver 24. The level shift driver 24 can be coupled to the voltage control device 200 and the memory array 22, and can shift the level of the input logic voltage $V_{ctrl1}$ to generate a driving control voltage $V_{ctrl2}$ for controlling the memory array 22.

Generally, the level shift driver 24 can output the corresponding driving control voltage $V_{ctrl2}$ according to the input logic voltage $V_{ctrl1}$, so that the high level of the driving control voltage $V_{ctrl2}$ can be, for example, close to the first system voltage V1 to drive the memory cells 22A in the memory array 22.

However, different memory systems may be operated in different conditions, and may have components with different parameter variations. Therefore, the first system voltages V1 generated by the constant voltage sources in different memory systems may also be different. For example, in different memory systems, the first system voltages V1 can be between the minimum value 2.5V and maximum value 5.7V. If the high level of the input logic voltage $V_{ctrl1}$ is between 1.2V and 1.98V, and the level shift driver 24 shifts the input logic voltage $V_{ctrl1}$ to be close to the first system voltage V1, then the pull-up transistors and the pull-down transistors in the level shift driver 24 may be disproportionally biased. For example, when the first system voltage V1 has a maximum value, such as 5.7V, and the input logic voltage $V_{ctrl1}$ changes from the low voltage of 0V to the high voltage 1.2V, the pull-up transistors and the pull-down transistors of the level shift driver 24 will be disproportionally biased and will be turned on simultaneously, thereby lowering the efficiency of the level shift driver 24. In this case, the level shift driver 24 may have to select the pull-up transistors and the pull-down transistors of proper sizes according to the actual operation conditions.

To address this issue, the voltage control device 200 can further include a fourth power switch 260. The fourth power switch 260 has a first input terminal, a second input terminal, and an output terminal. The first input terminal of the fourth power switch 260 can receive the first system voltage V1, the second input terminal of the fourth power switch 260 can be coupled to the output terminal of the first charge pump 210, and the output terminal of the fourth power switch 260 can be coupled to the level shift driver 24.

When the memory system 20 performs the read operation, the voltage control device 200 can enter the third mode. In the third mode, the output terminal of the fourth power switch 260 can output the first application voltage VP1 generated by the first charge pump 210, so that the level shift driver 24 can shift the input logic voltage $V_{ctrl1}$ according to the first application voltage VP1. In this case, the first application voltage VP1 can be set to have a predetermined value that is greater than the minimum value of the first system voltage VP1 (e.g. 2.5V) and smaller than the maximum value of the first system voltage VP1 (e.g. 5.7V). That is, the predetermined value of the first application voltage VP1 can be set between the minimum value and the maximum value of the first system voltage V1, for example but not limited to 3.5V, which is between 2.5V and 5.7V.

Consequently, the level shift driver 24 can receive the first application voltage VP1 to shift the input logic voltage and generate the driving control voltage $V_{ctrl2}$, allowing the pull-up transistors and the pull-down transistors in the level shift driver 24 to be proportionally biased. Therefore, the voltage raising speed can be increased, and the area of the level shift driver 24 can be reduced. That is, with the first charge pump 210 and the fourth power switch 260, the level shift driver 24 can receive the first application voltage VP1 with a predetermined and fixed value. Therefore, the poor efficiency caused by the variation of the first system voltages V1 in different memory system can be avoided, and the level shift driver 24 can be implemented with transistors of smaller sizes, reducing the area of the system.

In addition, when the voltage control device 200 is in a standby mode, the first charge pump 210 may stop generating the first application voltage VP1. In this case, the fourth power switch 260 can output the first system voltage V1 to the level shift driver 24 so as to prevent the memory system 22 from being floating. Moreover, when the voltage control device 200 is in the first mode and performs the erase operation to the memory cell 22A, or is in the second mode and performs the program operation to the memory cell 22A, the first application voltage VP1 generated by the first charge pump 210 would be a high voltage for the erase operation or the program operation. In this case, the first application voltage VP1 may be greater than the bias voltage required by the level shift driver 24. Therefore, the fourth power switch 260 can output the first system voltage V1 to the level shift driver 24 in this case.

In summary, the voltage control device and the memory system provided by the embodiments of the present invention can use the internal charge pump more efficiently to generate the required voltages, thereby reducing the area of the charge pumps. In addition, when applied to the memory system, the voltage control device can further generate proper operation voltages for the level shift driver, so the level shift driver can shift the level of the logic control signals more efficiently, and the overall area of the memory system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage control device comprising:
    a first charge pump having an input terminal configured to receive a first system voltage, and an output terminal configured to output a first application voltage, the first charge pump being configured to generate the first application voltage according to the first system voltage;
    a first power switch having a first input terminal configured to receive the first system voltage, a second input terminal configured to receive the first application voltage, and an output terminal;
    a second charge pump having an input terminal coupled to the output terminal of the first power switch, and an output terminal configured to output a second application voltage, the second charge pump being configured to generate the second application voltage according to a voltage received by the input terminal of the second charge pump;
    a second power switch having an input terminal configured to receive the second application voltage, and an output terminal; and
    a third power switch having a first input terminal coupled to the output terminal of the first charge pump, a second input terminal coupled to the output terminal of the second charge pump, and an output terminal.

2. The voltage control device of claim 1, wherein when the voltage control device is in a first mode:
    the output terminal of the first power switch outputs the first application voltage;
    the output terminal of the second power switch outputs the second application voltage; and
    the second application voltage is greater than the first application voltage, and the first application voltage is greater than the first system voltage.

3. The voltage control device of claim 2, wherein the first mode is enabled to provide an erase voltage required by a memory cell to perform an erase operation.

4. The voltage control device of claim 1, wherein when the voltage control device is in a second mode:
    the output terminal of the first power switch outputs the first system voltage;
    the third power switch forms a current path between the first input terminal of the third power switch and the output terminal of the third power switch to output the first application voltage, and forms a current path between the second input terminal of the third power switch and the output terminal of the third power switch to output the second application voltage simultaneously; and
    the first application voltage is substantially equal to the second application voltage, and the first application voltage is greater than the first system voltage.

5. The voltage control device of claim 4, wherein the second mode is enabled to provide a program voltage required by a memory cell to perform a program operation.

6. The voltage control device of claim 4, further comprising a fourth power switch having a first input terminal configured to receive the first system voltage, a second input terminal coupled to the output terminal of the first charge pump, and an output terminal.

7. The voltage control device of claim 6, wherein when the voltage control device is in a third mode:
    the output terminal of the fourth power switch outputs the first application voltage;
    the first application voltage is greater than a minimum value of the first system voltage and smaller than a maximum value of the first system voltage.

8. The voltage control device of claim 7, wherein the third mode is enabled to provide an operation voltage required by a memory cell to perform a read operation.

9. The voltage control device of claim 1, wherein a current load supported by the first charge pump is greater than a current load supported by the second charge pump.

10. A memory system comprising:
    a voltage control device comprising:
        a first charge pump having an input terminal configured to receive a first system voltage, and an output terminal configured to output a first application voltage, the first charge pump being configured to generate the first application voltage according to the first system voltage;
        a first power switch having a first input terminal configured to receive the first system voltage, a second input terminal configured to receive the first application voltage, and an output terminal;
        a second charge pump having an input terminal coupled to the output terminal of the first power switch, and an output terminal configured to output a second application voltage, the second charge pump being configured to generate the second application voltage according to a voltage received by the input terminal of the second charge pump;
        a second power switch having an input terminal configured to receive the second application voltage, and an output terminal; and
        a third power switch having a first input terminal coupled to the output terminal of the first charge pump, a second input terminal coupled to the output terminal of the second charge pump, and an output terminal; and
    a memory array comprising a plurality of memory cells, and coupled to the voltage control device, the memory array being configured to receive voltages outputted by the voltage control device and control the plurality of memory cells according to the voltages.

11. The memory system of claim 10, wherein when the memory system performs an erase operation:
    the output terminal of the first power switch outputs the first application voltage;
    the output terminal of the second power switch outputs the second application voltage;

the memory array receives the second application voltage to perform the erase operation to at least one memory cell of the plurality of memory cells; and the second application voltage is greater than the first application voltage, and the first application voltage is greater than the first system voltage.

12. The memory system of claim 10, wherein when the memory system performs a program operation:

the output terminal of the first power switch outputs the first system voltage;

the third power switch forms a current path between the first input terminal of the third power switch and the output terminal of the third power switch to output the first application voltage, and forms a current path between the second input terminal of the third power switch and the output terminal of the third power switch to output the second application voltage simultaneously;

the first application voltage is substantially equal to the second application voltage, and the first application voltage is greater than the first system voltage; and the memory array receives the first application voltage and the second application voltage to perform the program operation to at least one memory cell of the plurality of memory cells.

13. The memory system of claim 10, further comprising a level shift driver coupled to the voltage control device and the memory array, and configured to shift a level of an input logic voltage to generate a driving control voltage for controlling the memory array;

wherein the voltage control device further comprises a fourth power switch having a first input terminal configured to receive the first system voltage, a second input terminal coupled to the output terminal of the first charge pump, and an output terminal coupled to the level shift driver.

14. The memory system of claim 13, wherein when the memory system performs a read operation:

the output terminal of the fourth power switch outputs the first application voltage;

the first application voltage is greater than a minimum value of the first system voltage and smaller than a maximum value of the first system voltage; and the level shift driver receives the first application voltage to shift the level of the input logic voltage to generate the driving control voltage.

15. The memory system of claim 10, wherein a current load supported by the first charge pump is greater than a current load supported by the second charge pump.

* * * * *